United States Patent
Kodama et al.

(10) Patent No.: US 9,387,730 B2
(45) Date of Patent: Jul. 12, 2016

(54) PNEUMATIC TIRE

(71) Applicant: The Yokohama Rubber Co., LTD., Minato-ku, Tokyo (JP)

(72) Inventors: Yuji Kodama, Hiratsuka (JP); Masataka Koishi, Hiratsuka (JP); Hiroshi Tokizaki, Tokyo (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/408,253

(22) PCT Filed: Apr. 23, 2013

(86) PCT No.: PCT/JP2013/061957
§ 371 (c)(1),
(2) Date: Dec. 15, 2014

(87) PCT Pub. No.: WO2014/030391
PCT Pub. Date: Feb. 27, 2014

(65) Prior Publication Data
US 2015/0136292 A1    May 21, 2015

(30) Foreign Application Priority Data
Aug. 20, 2012   (JP) ................................. 2012-181700

(51) Int. Cl.
*B60C 13/00* (2006.01)
*B60C 13/02* (2006.01)

(52) U.S. Cl.
CPC .............. *B60C 13/02* (2013.01); *B60C 13/002* (2013.04)

(58) Field of Classification Search
CPC ........ B60C 13/00; B60C 13/002; B60C 13/02
USPC ................................................. 152/523–525
See application file for complete search history.

(56) References Cited

U.S. PATENT DOCUMENTS

| 8,522,844 | B2 | 9/2013 | Yamaguchi | |
|---|---|---|---|---|
| 2006/0157178 | A1* | 7/2006 | Ibaraki | B60C 13/001 152/209.16 |
| 2009/0032161 | A1* | 2/2009 | Yamaguchi | B60C 13/02 152/523 |
| 2011/0297283 | A1* | 12/2011 | Kouno | B60C 1/0025 152/209.1 |

(Continued)

FOREIGN PATENT DOCUMENTS

| JP | 08197917 A | * | 8/1996 |
|---|---|---|---|
| JP | 2009-029380 | | 2/2009 |

(Continued)

OTHER PUBLICATIONS

Machine Translation: JP 08197917 A; Takeuchi, Tatsuo; no date.*

(Continued)

*Primary Examiner* — Michael H Wilson
*Assistant Examiner* — Kendra Ly
(74) *Attorney, Agent, or Firm* — Thorpe North & Western

(57) ABSTRACT

In a tire, protrusions are disposed at intervals in the tire circumferential direction in at least one tire side portion, extending in an elongated manner from the inner side to the outer side in the tire radial direction including the maximum tire width position, the extension direction of each of the protrusions is inclined with respect to the tire radial direction, and the each of the protrusions adjacent to each other in the tire circumferential direction is disposed with the opposite orientation of the inclination with respect to the tire radial direction.

6 Claims, 18 Drawing Sheets

(56) References Cited

U.S. PATENT DOCUMENTS

| | | | |
|---|---|---|---|
| 2012/0097304 A1* | 4/2012 | Kojima | B60C 13/02 152/523 |
| 2012/0097305 A1 | 4/2012 | Kuroshi et al. | |
| 2013/0292025 A1 | 11/2013 | Kuroishi et al. | |

FOREIGN PATENT DOCUMENTS

| | | | | |
|---|---|---|---|---|
| JP | 2009-029385 | | 2/2009 | |
| JP | 2009-279954 | | 12/2009 | |
| JP | 2010-260378 | | 11/2010 | |
| JP | 2010260378 A | * | 11/2010 | |
| JP | 2011-168218 | | 9/2011 | |
| JP | 2011168218 A | * | 9/2011 | |
| JP | 2011-246122 | | 12/2011 | |
| JP | 2012-030557 | | 2/2012 | |
| JP | 2013060181 A | * | 4/2013 | |
| WO | WO 2010/126091 | | 11/2010 | |

OTHER PUBLICATIONS

Machine Translation: JP 2011168218 A; Shimada, Norihiro; no date.*

Machine Translation: JP 2013060181; Suzuki, Keita; no date.*

International Search Report for International Application No. PCT/JP2013/061957 dated Jun. 11, 2013, 2 pages, Japan.

* cited by examiner

| | Conventional Example 1 | Comparative Example 1 | Working Example 1 | Working Example 2 | Working Example 3 | Working Example 4 |
|---|---|---|---|---|---|---|
| Protrusion arrangement | ○ | ○ | ○ | ○ | ○ | ○ |
| Adjacent protrusions disposed to be symmetrical with respect to the tire radial direction | ○ | ○ | × | ○ | ○ | ○ |
| Angle of the protrusions with respect to the tire radial direction [°] | 0 | 0 | ±70 | ±70 | ±70 | ±1 |
| Protrusion height (mm) | 0.9 | 0.9 | 0.9 | 0.9 | 0.9 | 0.9 |
| No. of protrusions in tire circumferential direction (No.) | 9 | 9 | 9 | 9 | 9 | 9 |
| Protrusion width (mm) | 0.4 | 0.4 | 0.4 | 0.4 | 0.4 | 0.4 |
| Fin row overlap | × | × | × | × | × | × |
| Recess arrangement | × | × | × | × | × | × |
| Arrangement of protrusions relative to vehicle | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE |
| Fuel economy improvement rate | 100 | 100.1 | 100.1 | 100.1 | 100.1 | 100.1 |
| Uniformity | 100 | 99 | 101 | 102 | 102 | 100.5 |

FIG. 27A

| | Working Example 5 | Working Example 6 | Working Example 7 | Working Example 8 | Working Example 9 | Working Example 10 | Working Example 11 |
|---|---|---|---|---|---|---|---|
| Protrusion arrangement | ○ | ○ | ○ | ○ | ○ | ○ | ○ |
| Adjacent protrusions disposed to be symmetrical with respect to the tire radial direction | ○ | ○ | ○ | ○ | ○ | ○ | ○ |
| Angle of the protrusions with respect to the tire radial direction [°] | ±60 | ±30 | ±30 | ±30 | ±30 | ±30 | ±30 |
| Protrusion height (mm) | 0.9 | 0.9 | 0.9 | 0.9 | 0.9 | 0.9 | 0.9 |
| No. of protrusions in tire circumferential direction (No.) | 9 | 9 | 9 | 9 | 9 | 9 | 9 |
| Protrusion width (mm) | 0.4 | 0.4 | 0.4 | 0.4 | 0.4 | 0.4 | 0.4 |
| Fin row overlap | × | × | ○ | ○ | ○ | ○ | ○ |
| Recess arrangement | × | × | × | ○ | × | × | ○ |
| Arrangement of protrusions relative to vehicle | VEHICLE OUTER SIDE | VEHICLE OUTER SIDE | VEHICLE OUTER SIDE | VEHICLE OUTER SIDE | VEHICLE INNER SIDE | VEHICLE BOTH SIDES | VEHICLE INNER SIDE |
| Fuel economy improvement rate | 100.1 | 100.1 | 100.1 | 100.5 | 101 | 101.1 | 101.5 |
| Uniformity | 101.5 | 101.5 | 102 | 102 | 102 | 102 | 102 |

FIG. 27B

| | Conventional Example 2 | Comparative Example 2 | Working Example 12 | Working Example 13 | Working Example 14 | Working Example 15 |
|---|---|---|---|---|---|---|
| Protrusion arrangement (Reference diagram) | ○ | ○ | ○ (FIG. 3) | ○ (FIG. 3) | ○ (FIG. 3) | ○ (FIG. 3) |
| Adjacent protrusions disposed to be symmetrical with respect to the tire radial direction | ○ | ○ | ○ | ○ | ○ | ○ |
| Angle of the protrusions with respect to the tire radial direction [°] | 0 | 0 | ±30 | ±30 | ±30 | ±30 |
| Protrusion height (mm) | 10 | 10 | 1 | 10 | 1 | 10 |
| No. of protrusions in tire circumferential direction (No.) | 50 | 50 | 10 | 10 | 50 | 50 |
| Protrusion width (mm) | 5 | 5 | 0.5 | 0.5 | 0.5 | 0.5 |
| Fin row overlap | × | × | × | × | × | × |
| Recess arrangement | × | × | × | × | × | × |
| Arrangement of protrusions relative to vehicle | VEHICLE OUTER SIDE | VEHICLE OUTER SIDE | VEHICLE OUTER SIDE | VEHICLE OUTER SIDE | VEHICLE OUTER SIDE | VEHICLE OUTER SIDE |
| Fuel economy improvement rate | 100 | 100.2 | 100.2 | 100.2 | 100.2 | 100.2 |
| Uniformity | 100 | 98 | 102 | 101 | 101 | 100.5 |

FIG. 28A

| | Working Example 16 | Working Example 17 | Working Example 18 | Working Example 19 | Working Example 20 | Working Example 21 | Working Example 22 |
|---|---|---|---|---|---|---|---|
| Protrusion arrangement (Reference diagram) | O (FIG. 3) | O (FIG. 3) | O (FIG. 19) | O (FIG. 19) | O (FIG. 20) | O (FIG. 20) | O (FIG. 20) |
| Adjacent protrusions disposed to be symmetrical with respect to the tire radial direction | O | O | O | O | O | O | O |
| Angle of the protrusions with respect to the tire radial direction [°] | ±30 | ±30 | ±30 | ±30 | ±30 | ±30 | ±30 |
| Protrusion height (mm) | 1 | 10 | 10 | 10 | 10 | 10 | 10 |
| No. of protrusions in tire circumferential direction (No.) | 10 | 10 | 50 | 50 | 50 | 50 | 50 |
| Protrusion width (mm) | 5 | 5 | 5 | 5 | 5 | 5 | 5 |
| Fin row overlap | × | × | O | O | O | O | O |
| Recess arrangement | × | × | × | O | × | × | O |
| Arrangement of protrusions relative to vehicle | VEHICLE OUTER SIDE | VEHICLE OUTER SIDE | VEHICLE OUTER SIDE | VEHICLE OUTER SIDE | VEHICLE INNER SIDE | VEHICLE BOTH SIDES | VEHICLE INNER SIDE |
| Fuel economy improvement rate | 100.2 | 100.2 | 100.2 | 100.5 | 101 | 101.1 | 101.5 |
| Uniformity | 101.5 | 101 | 102 | 102 | 102 | 102 | 102 |

FIG. 28B

| | Conventional Example 3 | Comparative Example 3 | Working Example 23 (FIG. 3) | Working Example 24 (FIG. 19) | Working Example 25 (FIG. 19) | Working Example 26 (FIG. 20) | Working Example 27 (FIG. 20) | Working Example 28 (FIG. 20) |
|---|---|---|---|---|---|---|---|---|
| Protrusion arrangement (Reference diagram) | ○ | ○ | ○ | ○ | ○ | ○ | ○ | ○ |
| Adjacent protrusions disposed to be symmetrical with respect to the tire radial direction | ○ | ○ | ○ | ○ | ○ | ○ | ○ | ○ |
| Angle of the protrusions with respect to the tire radial direction [°] | 0 | 0 | ±30 | ±30 | ±30 | ±30 | ±30 | ±30 |
| Protrusion height (mm) | 5 | 5 | 5 | 5 | 5 | 5 | 5 | 5 |
| No. of protrusions in tire circumferential direction (No.) | 20 | 20 | 20 | 20 | 20 | 20 | 20 | 20 |
| Protrusion width (mm) | 3.5 | 3.5 | 3.5 | 3.5 | 3.5 | 3.5 | 3.5 | 3.5 |
| Fin row overlap | × | × | × | ○ | ○ | ○ | ○ | ○ |
| Recess arrangement | × | × | × | × | ○ | × | × | ○ |
| Arrangement of protrusions relative to vehicle | VEHICLE OUTER SIDE | VEHICLE OUTER SIDE | VEHICLE OUTER SIDE | VEHICLE OUTER SIDE | VEHICLE OUTER SIDE | VEHICLE INNER SIDE | VEHICLE BOTH SIDES | VEHICLE INNER SIDE |
| Fuel economy improvement rate | 100 | 100.1 | 100.1 | 100.1 | 100.5 | 101 | 101.1 | 101.5 |
| Uniformity | 100 | 99 | 101 | 102 | 102 | 102 | 102 | 102 |

FIG. 29

PNEUMATIC TIRE

TECHNICAL FIELD

The present technology relates to a pneumatic tire and particularly relates to a pneumatic tire by which air flow around a tire can be improved.

BACKGROUND

Conventionally, for example in Japanese Unexamined Patent Application Publication No. 2010-260378A, a pneumatic tire is disclosed in which a plurality of protrusions (projections) extending in the tire radial direction is provided at predetermined intervals in the tire circumferential direction on the tire side portion (tire side surface) on the inner side in the vehicle width direction when the tire is mounted on a vehicle, and a plurality of recesses is provided over the tire circumferential direction and the tire radial direction on the tire side portion on the outer side in the vehicle width direction when the tire is mounted on a vehicle. When mounted on a vehicle, air flows uniformly toward the rear on the outer side in the vehicle width direction, but on the inner side in the vehicle width direction, the tire is disposed within the tire house, and other components such as the axle and the like are disposed nearby, so the flow of the air is easily disturbed. According to this pneumatic tire, an air distribution promotion effect and rectification effect are obtained and the air resistance is reduced by the protrusions provided on the tire side portion on the inner side in the vehicle width direction where the air flow is easily disturbed, and turbulent flow is produced when the vehicle is traveling by the recesses provided on the tire side portion on the outer side in the vehicle width direction, the drag force that tends to pull the tire backward due to the low pressure portion produced to the rear of the tire when traveling is reduced, so the fuel consumption is improved.

Also, conventionally, for example in Japanese Unexamined Patent Application Publication No. 2009-029380A, a pneumatic tire is disclosed in which ridges are formed to generate turbulent flow in the tire side portion. These ridges for generating turbulence in Japanese Unexamined Patent Application Publication No. 2009-029380A include a plurality of inner side ridges disposed at intervals along the tire circumferential direction in a region on the inner side in the tire radial direction from the maximum tire width position, and a plurality of outer side ridges disposed at intervals along the tire circumferential direction in a region on the outer side in the tire radial direction from the maximum tire width position. Also, the plurality of inner side ridges is disposed so that the extension direction of each of the inner side ridges coincides with the tire radial direction, and the plurality of outer side ridges is disposed so that the extension direction of each of the outer side ridges is inclined with respect to the tire radial direction, and outer side ridges adjacent to each other are disposed with the opposite orientation of the inclination with respect to the tire radial direction. As a result of the inner side ridges, turbulent flow is generated on the region on the inner side in the tire radial direction from the maximum tire width position of the pneumatic tire, and the cooling is good. In addition, as a result of the outer side ridges, in the region to the outer side in the tire radial direction from the tire maximum width position of the pneumatic tire, reattachment of the air flowing in the tire circumferential direction to the tire side portion surface is facilitated, and the flow speed of the air flowing from the inner side to the outer side in the tire radial direction is increased, so the cooling is good.

By providing protrusions on the tire side portion as in the pneumatic tire disclosed in Japanese Unexamined Patent Application Publication No. 2010-260378A as described above, it is possible to improve the fuel economy, but the protrusions are disposed extending in the tire radial direction, so in the ground contact portion that contacts the road surface, the stiffness in the tire radial direction is locally increased in the tire circumferential direction and the uniformity is reduced, and there is a possibility that vibrations could be easily generated when traveling. Also, in the pneumatic tire disclosed in Japanese Unexamined Patent Application Publication No. 2009-029380A the inner side ridges are disposed so that the extension direction of the inner side ridges coincides with the tire radial direction, so likewise the uniformity is reduced, and there is a possibility that vibrations could be easily generated when traveling which could reduce the riding comfort. Moreover, in the pneumatic tire disclosed in Japanese Unexamined Patent Application Publication No. 2009-029380A, ridges are not provided at the maximum tire width position. According to the research of the inventors and others, it was found that the maximum tire width position is the portion that is the main factor increasing the air resistance of vehicles, so it is not possible to obtain a significant effect of reduction in the air resistance, which is the object of the pneumatic tire disclosed in Japanese Unexamined Patent Application Publication No. 2010-260378A.

SUMMARY

The present technology provides a pneumatic tire that is capable of maintaining the air resistance reduction effect of a vehicle as well as improving the uniformity.

A pneumatic tire according to the present technology includes a plurality of protrusions disposed at intervals in the tire circumferential direction on at least one tire side portion S, extending in an elongated manner from an inner side to an outer side in the tire radial direction including the maximum tire width position, the extension direction of each of the protrusions is inclined with respect to the tire radial direction, and each of the protrusions adjacent to each other in the tire circumferential direction is disposed with the opposite orientation of the inclination with respect to the tire radial direction.

According to this pneumatic tire, by obtaining an air distribution promotion effect and rectification effect at the maximum tire width position, which are the main factors for increasing the air resistance of the vehicle as a result of the protrusions provided in the tire side portion including the tire maximum width position, the air resistance reduction effect of a vehicle to which the pneumatic tire has been mounted is maintained, and it is possible to improve the fuel economy of the vehicle. Moreover, according to the pneumatic tire, the extension direction of the protrusions is inclined with respect to the tire radial direction, and each of the protrusions adjacent to each other in the tire circumferential direction is disposed with the opposite orientation of the inclination with respect to the tire radial direction, so the stiffness in the tire radial direction due to the protrusions is reduced, and the unevenness of the stiffness in the tire circumferential direction is reduced, so there is no local increase in the stiffness in the tire radial direction along the tire circumferential direction at the ground contact portion that contacts the road surface, so the uniformity can be improved.

Also, in the pneumatic tire, each of the protrusions that are adjacent to each other in the tire circumferential direction is disposed to be symmetric al with respect to the tire radial direction.

According to this pneumatic tire, by disposing each of the protrusions that are adjacent to each other in the tire circumferential direction to be symmetrical with respect to the tire radial direction, the unevenness of stiffness in the tire circumferential direction due to the protrusions is reduced, and it is possible to obtain a significant effect of improvement in the uniformity.

Also, in the pneumatic tire, the angle θ of the protrusions with respect to the tire radial direction with an end on the inner side in the tire radial direction as reference point about a tire rotational direction satisfies the range +1°≤θ≤+60°, or −60°≤θ≤−1°.

According to this pneumatic tire, by making the angle θ of the protrusions with respect to the tire radial direction not more than +60° and not less than −60°, it is possible to obtain a significant effect of reduction of air resistance. Also, by making the angle θ of the protrusions with respect to the tire radial direction not less than +1° and not more than −60°, it is possible to obtain a significant effect of improvement in uniformity.

Also, in the pneumatic tire, the height that the protrusions protrude from the tire side portion satisfies the range of not less than 1 mm and not more than 10 mm, the number thereof disposed in the tire circumferential direction satisfies the range of not less than 10 and not more than 50, and the width in the lateral direction satisfies the range of not less than 0.5 mm and not more than 5 mm.

If the height of the protrusions is not more than 1 mm, the range over which the protrusions contact the air flow is small, so it is difficult to obtain a more significant air distribution promotion effect and rectification effect due to the protrusions. Also, if the height of the protrusions exceeds 10 mm, the range over which the protrusions contact the air flow will be large, so the protrusions will increase the air resistance and the air distribution promotion effect and rectification effect will be small. Regarding this point, according to this pneumatic tire, the protrusions appropriately contact the air flow, so it is possible to obtain a more significant air distribution promotion effect and rectification effect due to the protrusions, and the air resistance reduction effect of the vehicle can be maintained. Also, when the number of protrusions is less than 10, it is difficult to obtain the air distribution promotion effect and the rectification effect. On the other hand, when the number of protrusions exceeds 50, the protrusions will increase the air resistance and the air distribution promotion effect and the rectification effect become smaller, the tire mass increases, and the rolling resistance tends to increase. Therefore, preferably, the number of protrusions is in the range of not less than 10 and not more than 50. In addition, when the width of the protrusions is less than 0.5 mm, the protrusions can easily deform and it becomes difficult to obtain the air distribution promotion effect and the rectification effect. On the other hand, when the width of the protrusions exceeds 5 mm, the protrusions will increase the air resistance and the air distribution promotion effect and the rectification effect become smaller, the tire mass increases, and the rolling resistance tends to increase. Therefore, preferably, the width of the protrusions is in the range of not less than 0.5 mm and not more than 5 mm.

Also, in the pneumatic tire of the present technology, the protrusions are formed as a row of fins divided in the longitudinal direction into a plurality of fins with each of the fins of the row of fins overlapping in the tire circumferential direction at least with the nearest fin, so that overall the row of fins extends from the inner side to the outer side in the tire radial direction including the maximum tire width position.

According to this pneumatic tire, by forming the protrusion as a row of fins divided into a plurality of fins, the strain due to bending of the tire side portion is dispersed in each individual fin, so the stiffness due to the protrusions is further suppressed, so it is possible to obtain a more significant effect of improvement in uniformity, and the durability of the protrusions can be improved.

Also, in the pneumatic tire of the present technology, the protrusions are disposed on a first tire side portion, and a plurality of recesses is disposed on a second tire side portion.

For example, if the protrusions are provided on the tire side portion on the vehicle outer side and the recesses are provided on the tire side portion on the vehicle inner side when mounted on a vehicle, the flow of air from the front side to the rear side of the vehicle is made turbulent on the vehicle inner side of the pneumatic tire when the air is passing between the pneumatic tire and the vehicle, due to the recesses. Also, on the vehicle outer side of the pneumatic tire, the air that passes the vehicle outer side is made turbulent due to the protrusions. Therefore, a turbulent flow boundary layer is generated on the periphery of the pneumatic tire, so on the vehicle inner side, expansion of air that escapes the vehicle outer side to the rear of the vehicle is suppressed, and on the vehicle outer side, expansion of the air passing the vehicle outer side of the pneumatic tire is suppressed. As a result, the spread of the passing air is suppressed, so the air resistance of the vehicle is reduced, and the fuel economy can be further improved.

Also, in the pneumatic tire, a vehicle inner/outer orientation when mounted on a vehicle is designated, and the protrusions are disposed on the tire side portion on the vehicle inner side.

The flow of air from the front side to the rear side of the vehicle is promoted and rectified by the protrusions on the vehicle inner side of the pneumatic tire. Therefore, turbulence of the air flow passing the vehicle inner side of the pneumatic tire is suppressed. On the other hand, the air flow from the front to the rear of the vehicle is made turbulent by the recesses on the vehicle outer side of the pneumatic tire, so a turbulent flow boundary layer is generated at the periphery of the pneumatic tire, and separation from the pneumatic tire is suppressed. Therefore, expansion of the air flow passing the vehicle outer side of the pneumatic tire is suppressed. As a result, the spreading of the passing air is suppressed, so the air resistance of the vehicle is further reduced, and it is possible to further improve the fuel economy.

The pneumatic tire according to the present technology is capable of maintaining the air resistance reduction effect of a vehicle as well as improving the uniformity.

BRIEF DESCRIPTION OF THE DRAWINGS

FIGS. 27A-27B include a table showing results of performance testing of pneumatic tires according to working examples of the present technology.

FIGS. 28A-28B include a table showing results of performance testing of pneumatic tires according to working examples of the present technology.

FIG. 29 is a table showing results of performance testing of pneumatic tires according to working examples of the present technology.

DETAILED DESCRIPTION

An embodiment of the present technology is described below in detail based on the drawings. However, the present technology is not limited to these embodiments. The constituents of the embodiment include constituents that can be easily replaced by those skilled in the art and constituents substantially the same as the constituents of the embodiment. Furthermore, a plurality of modified examples that are described in the embodiment can be freely combined within a scope of obviousness for a person skilled in the art.

Figure 1:
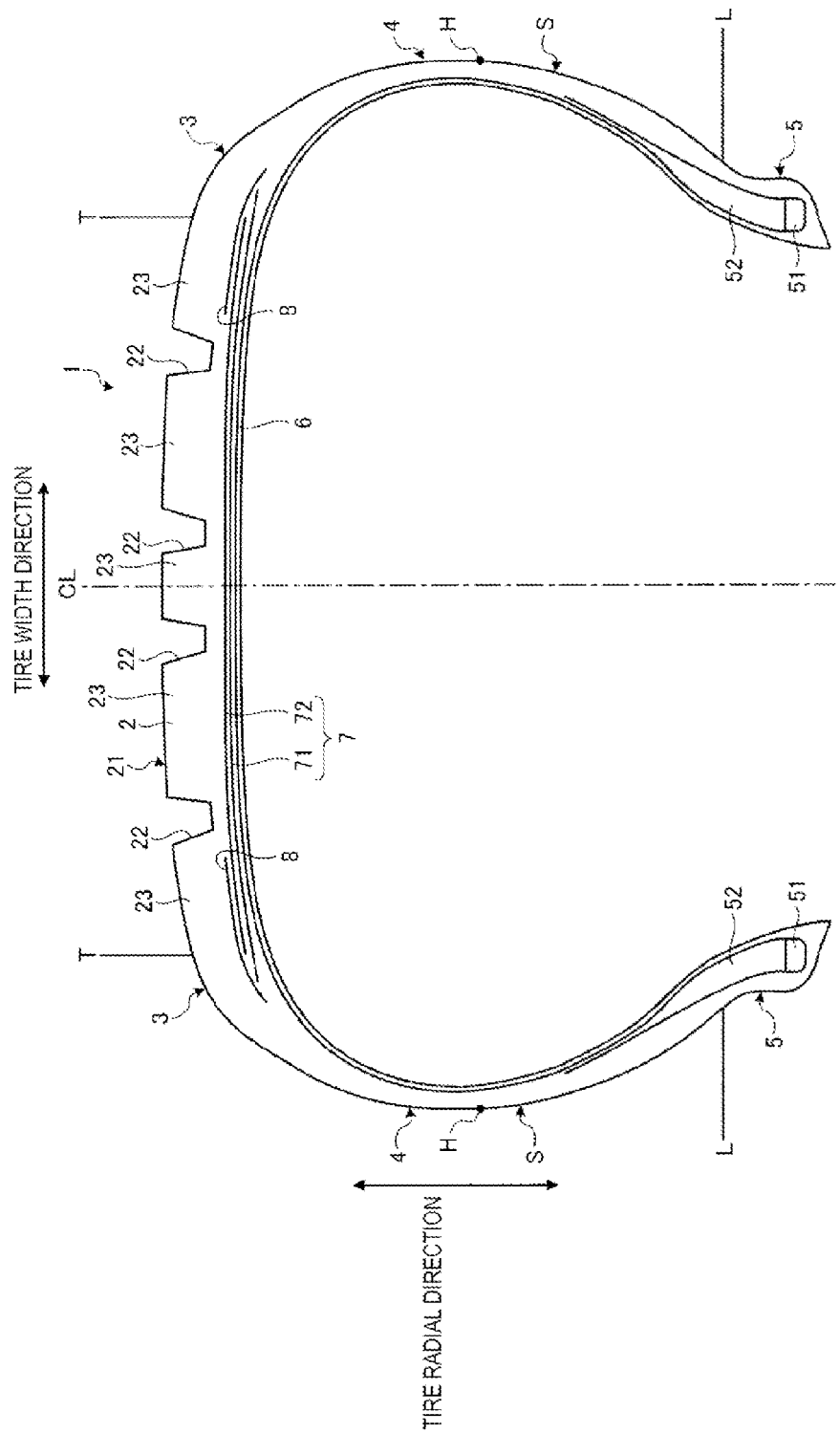
FIG. 1 is a meridian cross-sectional view of a pneumatic tire according to an embodiment of the present technology.

FIG. 1 is a meridian cross-sectional view of a pneumatic tire 1 according to the embodiment. In the following description, "tire radial direction" refers to a direction orthogonal to the rotational axis (not shown) of the pneumatic tire 1; "inner side in the tire radial direction" refers to the side facing the rotational axis in the tire radial direction; and "outer side in the tire radial direction" refers to the side distanced from the rotational axis in the tire radial direction. "Tire circumferential direction" refers to a circumferential direction with the rotational axis as a center axis. Additionally, "tire width direction" refers to the direction parallel to the rotational axis; "inner side in the tire width direction" refers to the side facing a tire equatorial plane CL (tire equator line) in the tire width direction; and "outer side in the tire width direction" refers to the side distanced from the tire equatorial plane CL in the tire width direction. "Tire equatorial plane CL" refers to a plane that is orthogonal to the rotational axis of the pneumatic tire 1 and that passes through a center of a tire width of the pneumatic tire 1. The tire width is a width in the tire width direction between constituents located to the outside in the tire width direction, or in other words, the distance between the constituents that are most distant in the tire width direction from the tire equatorial plane CL. "Tire equator line" refers to a line along the tire circumferential direction of the pneumatic tire 1 that lies on the tire equatorial plane CL. In this embodiment, "tire equator line" is given the same "CL" reference symbol as that used for the tire equatorial plane.

As illustrated in FIG. 1, the pneumatic tire 1 of this embodiment includes a tread portion 2, shoulder portions 3 on both sides of the tread portion 2, and a side wall portion 4 and a bead portion 5 continuing sequentially from each of the shoulder portions 3. Additionally, the pneumatic tire 1 includes a carcass layer 6, a belt layer 7, and a belt reinforcing layer 8.

The tread portion 2 is formed from a rubber material (tread rubber), is exposed on the outermost side in the tire radial direction of the pneumatic tire 1, and a surface thereof constitutes a profile of the pneumatic tire 1. A tread surface 21 is formed on a peripheral surface of the tread portion 2 or, rather, on a road contact surface that contacts a road surface when traveling. The tread surface 21 extends along the tire circumferential direction, and a plurality (four in this embodiment) of main grooves 22 that are straight main grooves parallel with the tire equator line CL are provided in the tread surface 21. Moreover, a plurality of rib-like land portions 23 extending along the tire circumferential direction and parallel with the tire equator line CL is formed in the tread surface 21 by the plurality of main grooves 22. Additionally, while not explicitly illustrated in the drawings, lug grooves that intersect with the main grooves 22 in each of the land portions 23 are provided in the tread surface 21. The land portions 23 are plurally divided in the tire circumferential direction by the lug grooves. Additionally, the lug grooves are formed so as to open to an outermost side in the tire width direction of the tread portion 2, that is, the outer side in the tire width direction. Note that the lug grooves may have a form that communicates with the main grooves 22 or may have a form that does not communicate with the main grooves 22.

The shoulder portions 3 are locations on both outer sides in the tire width direction of the tread portion 2. Additionally, the side wall portions 4 are exposed at an outermost side in the tire width direction of the pneumatic tire 1. The bead portions 5 include a bead core 51 and a bead filler 52. The bead core 51 is formed by winding a steel wire (bead wire) in a ring-like manner. The bead filler 52 is a rubber material that is disposed in space formed by ends of the carcass layer 6 in the tire width direction being folded up at a position of the bead core 51.

The ends of the carcass layer 6 in the tire width direction are folded over the pair of bead cores 51 from the inner side in the tire width direction to the outer side in the tire width direction, and the carcass layer 6 is stretched in a toroidal shape in the tire circumferential direction to form the framework of the tire. The carcass layer 6 is constituted by a plurality of carcass cords (not illustrated) disposed in parallel in the tire circumferential direction along the tire meridian direction having a given angle with respect to the tire circumferential direction, and covered by a coating rubber. The carcass cords are formed from organic fibers (e.g. polyester, rayon, nylon, or the like). At least one layer of this carcass layer 6 is provided.

The belt layer 7 has a multi-layer structure where at least two layers (belts 71 and 72) are stacked; is disposed on an outer side in the tire radial direction that is the periphery of the carcass layer 6, in the tread portion 2; and covers the carcass layer 6 in the tire circumferential direction. The belts 71 and 72 are constituted by a plurality of cords (not illustrated) disposed in parallel at a predetermined angle with respect to the tire circumferential direction (e.g. from 20 degrees to 30 degrees), and covered by a coating rubber. The cords are formed from steel or organic fibers (e.g. polyester, rayon, nylon, or the like). Moreover, the overlapping belts 71 and 72 are disposed so that the cords thereof mutually cross.

The belt reinforcing layer 8 is disposed on the outer side in the tire radial direction that is the periphery of the belt layer 7, and covers the belt layer 7 in the tire circumferential direction. The belt reinforcing layer 8 is constituted by a plurality of cords (not illustrated), disposed in parallel in the tire width direction and substantially parallel (±5 degrees) to the tire circumferential direction, which are covered by a coating rubber. The cords are formed from steel or organic fibers (e.g. polyester, rayon, nylon, or the like). The belt reinforcing layer 8 illustrated in FIG. 1 is disposed so as to cover end portions in the tire width direction of the belt layer 7. The configuration of the belt reinforcing layer 8 is not limited to that described above. While not explicitly illustrated in the drawings, a configuration may be used where the belt reinforcing layer 8 is disposed so as to cover an entirety of the belt layer 7. Alternatively, for example, a configuration may be used where the belt reinforcing layer 8 has two reinforcing layers, where the belt reinforcing layer 8 is formed so that the reinforcing layer on the inner side in the tire radial direction is longer in the tire width direction than the belt layer 7 and disposed so as to cover the entirety of the belt layer 7, and the reinforcing layer on the outer side in the tire radial direction is disposed so as only to cover the end portions in the tire width direction of the belt layer 7. Alternatively, for example, a configuration may be used where the belt reinforcing layer 8 has two reinforcing layers, where each of the reinforcing layers is disposed so as only to cover the end portions in the tire width direction of the belt layer 7. In other words, the belt reinforcing layer 8 overlaps with at least the end portions in the tire width direction of the belt layer 7. Additionally, the belt reinforcing layer 8 is provided by winding band-like (e.g. with a width of 10 mm) strip material in the tire circumferential direction.

Figure 2:
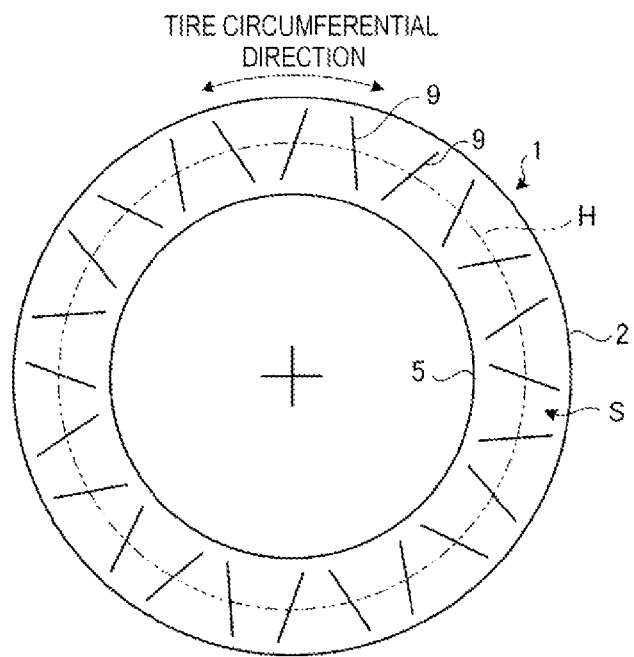
FIG. 2 is an appearance view of the pneumatic tire according to the embodiment of the present technology, viewed from the tire width direction.
Figure 3:
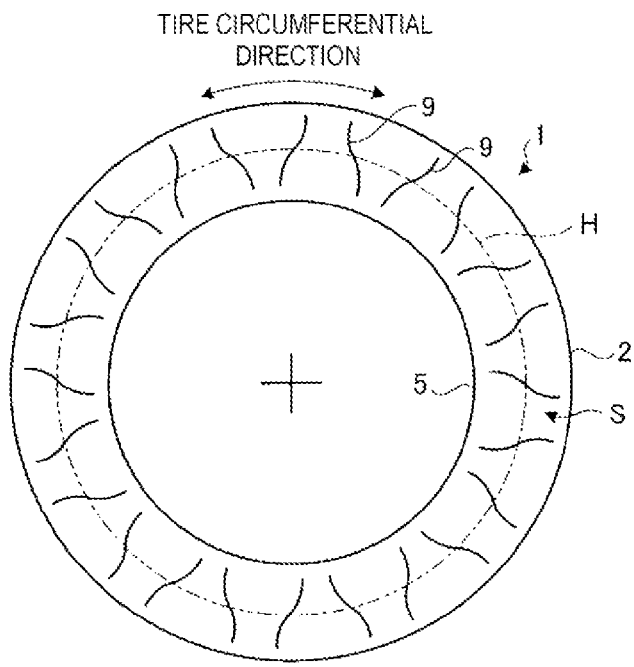
FIG. 3 is an appearance view of the pneumatic tire according to the embodiment of the present technology, viewed from the tire width direction.
Figure 4:
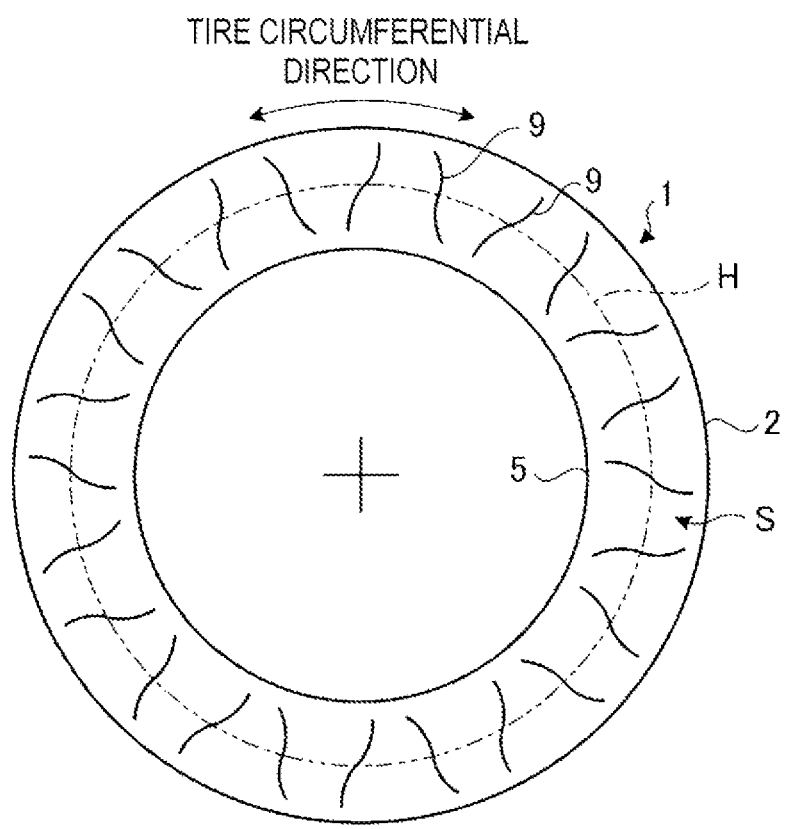
FIG. 4 is an appearance view of the pneumatic tire according to the embodiment of the present technology, viewed from the tire width direction.

FIGS. 2 to 4 are appearance views of the pneumatic tire according to the embodiment of the present technology, viewed from the tire width direction. With the pneumatic tire 1 configured as described above, as illustrated in FIGS. 2 to 4, a plurality of protrusions 9 is provided protruding outward of the tire from the surface of the tire side portion S on the tire side portion S.

Here, the "tire side portion S" refers to, in FIG. 1, the outer side in the tire width direction from a ground contact edge T of the tread portion 2 or, in other words, a surface that uniformly continues in a range of the outer side in the tire radial direction from a rim check line L. Additionally, the "ground contact edge T" refers to both outermost edges in the tire width direction of a region in which the tread surface 21 of the tread portion 2 of the pneumatic tire 1 contacts the road surface when the pneumatic tire 1 is assembled on a regular rim and filled with regular inner pressure and 70% of a regular load is applied, and the ground contact edge T continues in the tire circumferential direction. Moreover, the "rim check line L" refers to a line used to confirm whether the tire has been assembled on the rim correctly and, typically, is an annular convex line closer to the outer side in the tire radial direction than a rim flange and continues in the tire circumferential direction along a portion adjacent to the rim flange on a front side surface of the bead portions 5.

Here, "Regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO.

As illustrated in FIGS. 2 and 3, the protrusions 9 are formed as ridges made from a rubber material (may be the rubber material forming the tire side portion S or a rubber material different from that rubber material) extending in an elongated manner from the inner side to the outer side in the tire radial direction including the maximum tire width position H in the region of the tire side portion S, and a plurality thereof is disposed at a predetermined pitch in the tire circumferential direction.

Here, the maximum tire width position H is the position in the tire width direction that is largest when the pneumatic tire 1 is assembled onto a regular rim, and filled with the regular inner pressure under no load conditions. In tires provided with a rim protection bar (provided on the inner side in the tire radial direction of the tire side portion S along the tire circumferential direction and projecting to the outer side in the tire width direction) that protects the rim, the rim protection bar is the largest portion in the tire width direction, but the maximum tire width position H as defined in this embodiment excludes the rim protection bar. Also, tires provided with a rim protection bar include configurations in which the end of the protrusions 9 on the inner side in the tire radial direction do not reach the rim protection bar, configurations in which the end of the protrusions 9 on the inner side in the tire radial direction reach the projection of the rim protection bar at mid height, and configurations in which the end of the protrusions 9 on the inner side in the tire radial direction reach the top of the rim protection bar.

The protrusions are disposed so that their extension direction is inclined with respect to the tire radial direction. Also, each of the protrusions 9 adjacent to each other in the tire circumferential direction is disposed with the opposite orientation of the inclination with respect to the tire radial direction.

Figure 5:
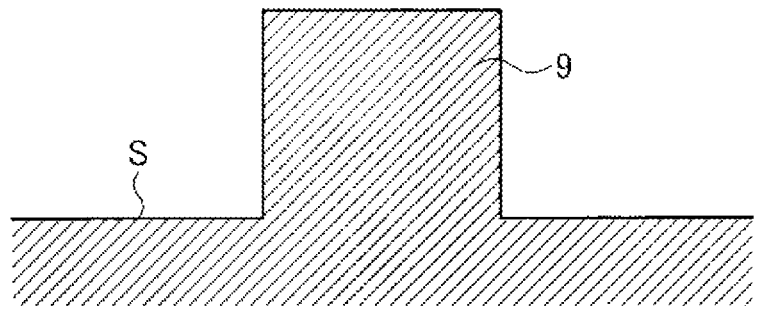
FIG. 5 is a cross-sectional view in the lateral direction of a protrusion.
Figure 6:
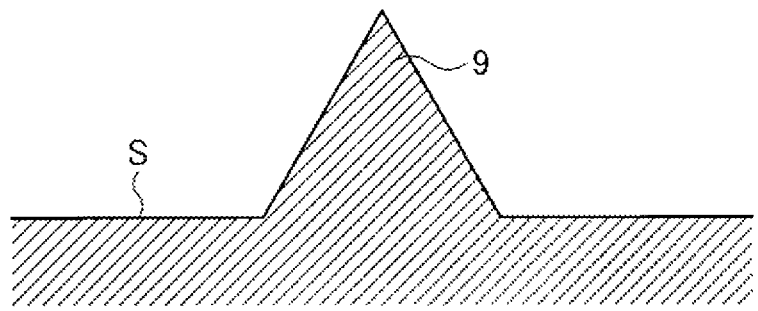
FIG. 6 is a cross-sectional view in the lateral direction of a protrusion.
Figure 7:
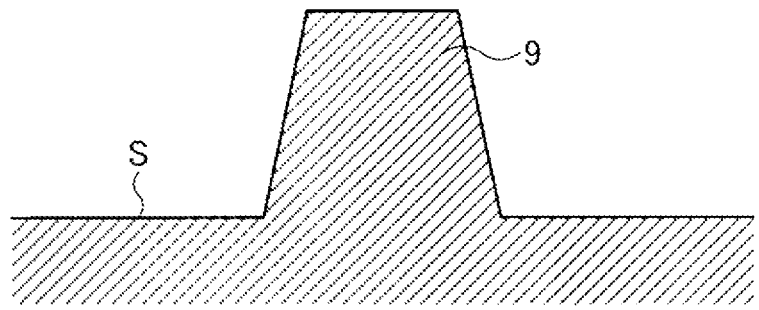
FIG. 7 is a cross-sectional view in the lateral direction of a protrusion.
Figure 8:
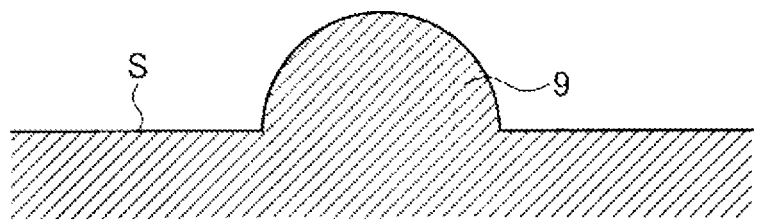
FIG. 8 is a cross-sectional view in the lateral direction of a protrusion.
Figure 9:
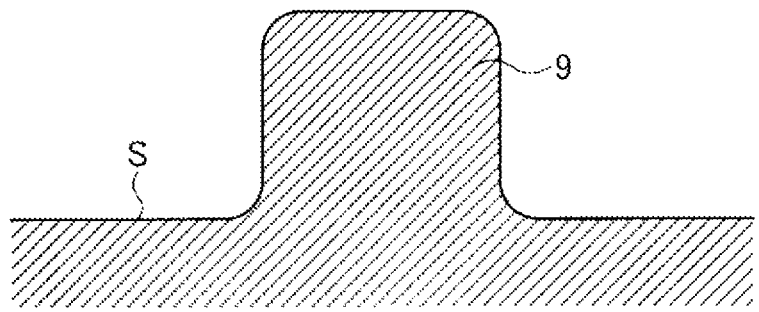
FIG. 9 is a cross-sectional view in the lateral direction of a protrusion.
Figure 10:
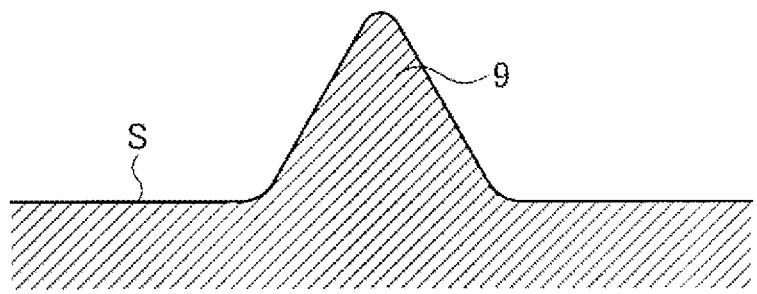
FIG. 10 is a cross-sectional view in the lateral direction of a protrusion.
Figure 11:
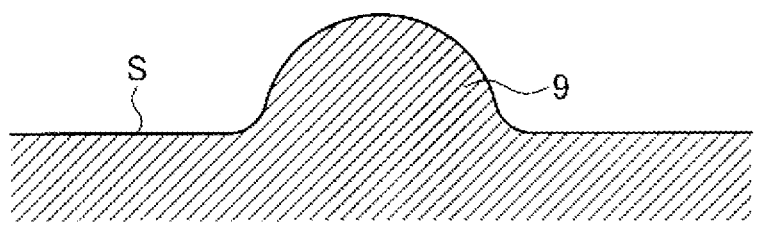
FIG. 11 is a cross-sectional view in the lateral direction of a protrusion.

Specifically, the protrusions 9 illustrated in FIG. 2 are formed as straight line ridges in their longitudinal direction, their extension directions (longitudinal direction) are inclined with respect to the tire radial direction, and each of the protrusions 9 adjacent to each other in the tire circumferential direction is disposed with the opposite orientation of the inclination with respect to the tire radial direction. Also, the protrusions 9 illustrated in FIG. 3 are formed as S-shaped ridges in the longitudinal direction, their extension directions (longitudinal direction) are inclined with respect to the tire radial direction, and each of the protrusions 9 adjacent to each other in the tire circumferential direction is disposed with the opposite orientation of the inclination with respect to the tire radial direction. The protrusions 9 illustrated in FIG. 3 have symmetrical shapes in which the shape of each of the protrusions 9 adjacent to each other in the tire circumferential direction is inverted about the tire radial direction. Also, the protrusions 9 illustrated in FIG. 4 are formed as S-shaped ridges in the longitudinal direction, their extension directions (longitudinal direction) are inclined with respect to the tire radial direction, and each of the protrusions 9 adjacent to each other in the tire circumferential direction is disposed with the opposite orientation of the inclination with respect to the tire radial direction. The protrusions 9 illustrated in FIG. 4 have the same shape and the shape of each of the protrusion 9 adjacent to each other in the tire circumferential direction is not inverted about the tire radial direction. In the case of the straight line protrusions 9 illustrated in FIG. 2, the extension direction is the direction along the straight line, but in other cases such as the S-shaped protrusions 9 as illustrated in FIGS. 3 and 4, or while not explicitly illustrated in the drawings, for example, a bent shape such as a Z-shape, a dog-leg shape, or a zigzag shape, or a curved shape such as a C shape or a wavy shape, the extension direction is the direction of a straight line that connects the center in the lateral direction (direction intersecting the longitudinal direction) of the end on the inner side in the tire radial direction and the center in the lateral direction of the end on the outer side in the tire radial direction Also, the protrusions 9 are formed so that, for example, their cross-sectional shape in the lateral direction has the cross-sectional shape in the lateral direction of the protrusions illustrated in FIGS. 5 to 11. The protrusion 9 illustrated in FIG. 5 has a cross-sectional shape in the lateral direction that is a rectangular shape. The protrusion 9 illustrated in FIG. 6 has a cross-sectional shape in the lateral direction that is a triangular shape. The protrusion 9 illustrated in FIG. 7 has a cross-sectional shape in the lateral direction that is a trapezoidal shape. In addition, while not explicitly illustrated in the drawings, the cross-sectional shape in the lateral direction of the protrusions 9 may be various shapes such as a triangular shape on the top of rectangular shape, or a zigzag shape on the top of rectangular shape. Also, the cross-sectional shape in the lateral direction of the protrusions 9 may have an external form based on curved lines. The protrusion 9 illustrated in FIG. 8 has a cross-sectional shape in the lateral direction that is a semi-circular shape. In addition, while not explicitly illustrated in the drawings, the cross-sectional shape in the lateral direction of the protrusions 9 may have various shapes such as, for example, a semi-elliptical shape or a semi-oval-shape. Also, the cross-sectional shape in the lateral direction of the protrusions 9 may have an external form that is a combination of straight lines and curves. The protrusion 9 illustrated in FIG. 9 has a cross-sectional shape in the lateral direction that is a rectangular shape whose corners are curved. The protrusion 9 illustrated in FIG. 10 has a cross-sectional shape in the lateral direction that is a triangular shape whose corners are curved. In addition, while not illustrated in the drawings, the shape may be various shapes such as a waveform on the top of rectangular shape. Also, as illustrated in FIGS. 9 to 11, the cross-sectional shape in the lateral direction of the protrusions 9 may have a shape in which the base portion that projects from the tire side portion S is curved. Also, the protrusions 9 may be formed with a uniform cross-sectional shape in the longitudinal direction (projection height from the tire side portion S or width in the lateral direction), or may be formed with a cross-sectional shape in the longitudinal direction that varies.

Also, in the tire width direction, the protrusions 9 may be provided on the tire side portion S on both sides, or they may be provided on the tire side portion S on one side.

In this way, the pneumatic tire 1 according to the embodiment includes a plurality of protrusions 9 disposed at intervals in the tire circumferential direction in at least one tire side portion S extending in an elongated manner from the inner side to the outer side in the tire radial direction including the maximum tire width position H, the extension direction of each of the protrusions 9 is inclined with respect to the tire radial direction, and the each of the protrusions 9 adjacent to each other in the tire circumferential direction is disposed with the opposite orientation of the inclination with respect to the tire radial direction.

According to the pneumatic tire 1, by obtaining an air distribution promotion effect and rectification effect at the tire maximum width position H, which are the main factors for increasing the air resistance of the vehicle, as a result of the protrusions 9 provided in the tire side portion S including the tire maximum width position H, the air resistance reduction effect of a vehicle on which the pneumatic tire 1 has been mounted is maintained, and it is possible to improve the fuel economy of the vehicle. Moreover, according to the pneumatic tire 1, the extension direction of the protrusions 9 is inclined with respect to the tire radial direction, and each of the protrusions 9 adjacent to each other in the tire circumferential direction is disposed with the opposite orientation of the inclination with respect to the tire radial direction, so the stiffness in the tire radial direction by the protrusions 9 is suppressed, and the unevenness of the stiffness in the tire circumferential direction is suppressed, so there is no local increase in the stiffness in the tire radial direction along the tire circumferential direction at the ground contact portion that contacts the road surface, so it is possible to improve the uniformity and suppress the occurrence of vibrations during traveling.

Also, as illustrated in FIGS. 2 and 3, preferably, each of the protrusions 9 adjacent to each other in the tire circumferential direction is disposed to be symmetrical with respect to the tire radial direction.

According to this pneumatic tire 1, by disposing each of the protrusions 9 adjacent to each other in the tire circumferential direction to be symmetrical with respect to the tire radial direction, the unevenness of stiffness in the tire circumferential direction due to the protrusions 9 is suppressed, and it is possible to obtain a significant effect of improvement in the uniformity.

Also, in the pneumatic tire 1 according to the embodiment, preferably, the angle θ of the protrusions 9 with respect to the tire radial direction with the end on the inner side in the tire radial direction as reference point about the tire rotational direction satisfies the range of $+1° \leq \theta \leq +60°$ or $-60° \leq \theta \leq +1°$.

Figure 12:
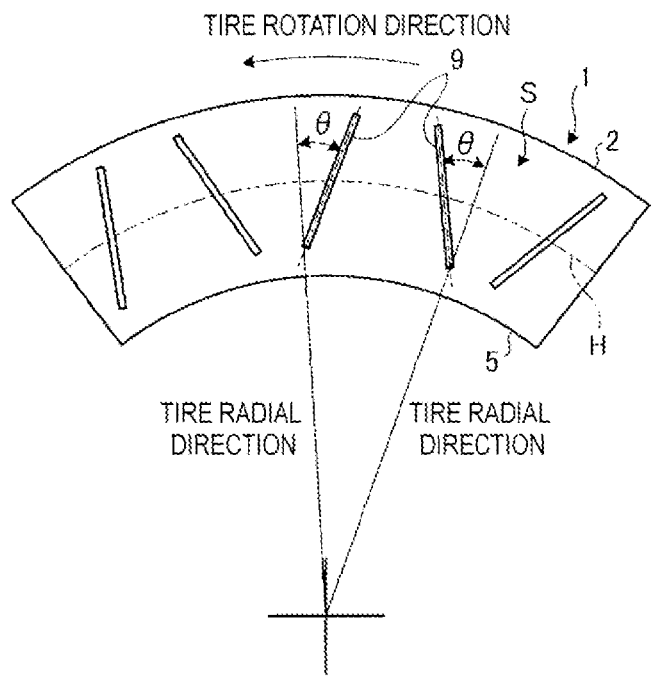
FIG. 12 is a partial appearance view of the pneumatic tire according to the embodiment of the present technology, viewed from the tire width direction.

Specifically, as illustrated in the partial appearance view viewed from the tire width direction of the pneumatic tire according to the embodiment in FIG. 12, the extension direction of each of the protrusions 9 whose extension direction is a straight line is inclined with respect to the tire radial direction, and each of the protrusions 9 adjacent to each other in the tire circumferential direction is disposed with the opposite orientation of the inclination with respect to the tire radial direction, so the angle θ of each of the protrusions 9 adjacent to each other in the tire circumferential direction with respect to the tire radial direction with the end on the inner side in the tire radial direction as reference point satisfies the range of +1° to +60° with respect to the tire rotational direction for one, and the other satisfies the range of −60° to −1°.

Figure 13:
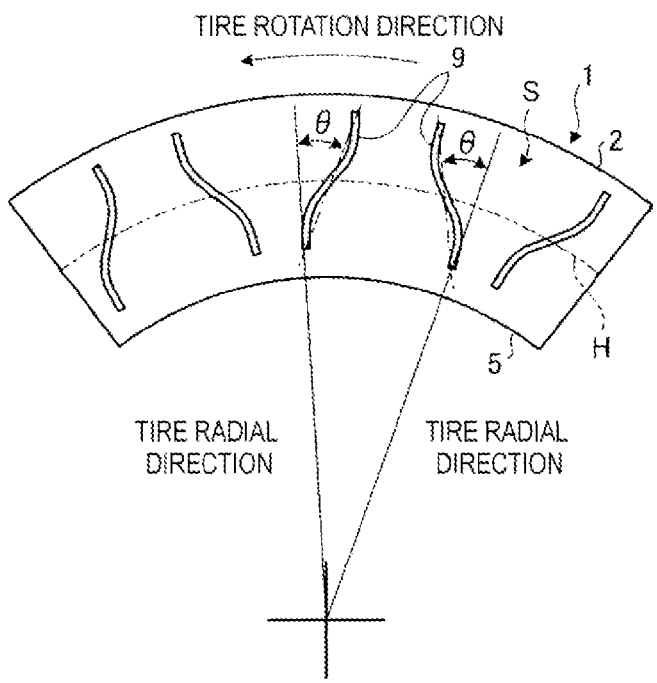
FIG. 13 is a partial appearance view of the pneumatic tire according to the embodiment of the present technology, viewed from the tire width direction.
Figure 14:
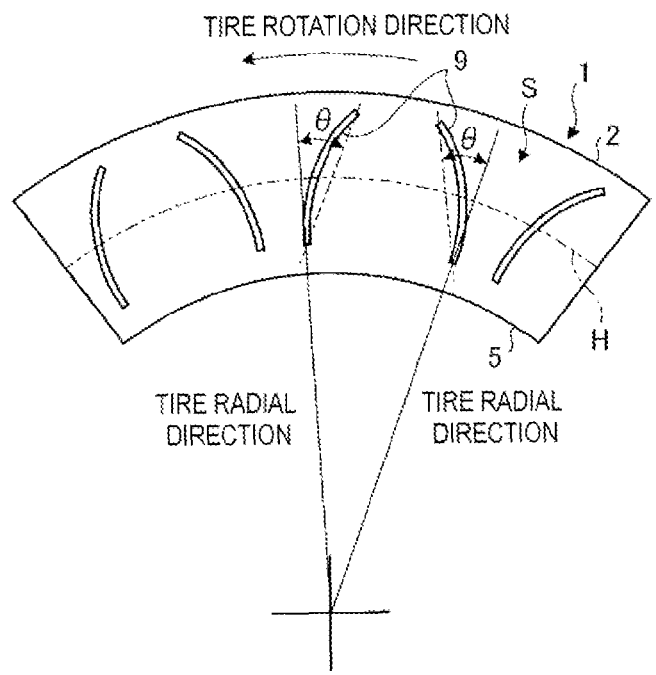
FIG. 14 is a partial appearance view of the pneumatic tire according to the embodiment of the present technology, viewed from the tire width direction.
Figure 15:
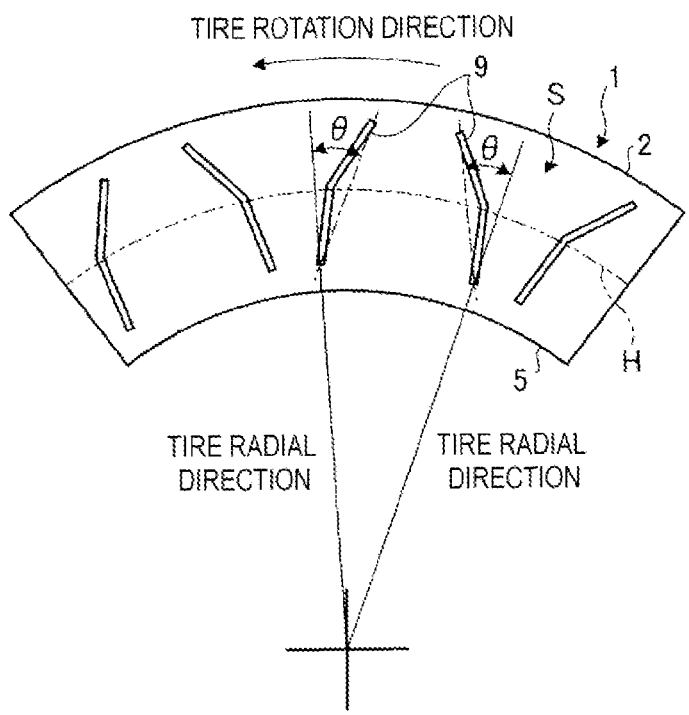
FIG. 15 is a partial appearance view of the pneumatic tire according to the embodiment of the present technology, viewed from the tire width direction.

Also, as stated above, the extension direction of the protrusions 9 is the straight line that connects the center in the lateral direction (direction intersecting the longitudinal direction) of the end on the inner side in the tire radial direction and the center in the lateral direction of the end on the outer side in the tire radial direction. Therefore, for example, in the case of a protrusion 9 that is curved in an S shape in the extension direction as illustrated in the partial appearance view viewed from the tire width direction of the pneumatic tire according to the embodiment in FIG. 13, or a protrusion 9 that is curved in a C shape in the extension direction as illustrated in the partial appearance view viewed from the tire width direction of the pneumatic tire according to the embodiment in FIG. 14, or a protrusion 9 that is bent in a dog-leg shape in the extension direction as illustrated in the partial appearance view viewed from the tire width direction of the pneumatic tire according to the embodiment in FIG. 15, the extension direction is inclined with respect to the tire radial direction, and each of the protrusions 9 adjacent to each other in the tire circumferential direction is disposed with the opposite orientation of the inclination with respect to the tire radial direction, and the angle θ of each of the protrusions 9 adjacent to each other in the tire circumferential direction with respect to the tire radial direction with the end on the inner side in the tire radial direction as reference point satisfies the range of +1° to +60° with respect to the tire rotational direction for one, and the other satisfies the range of −60° to −1°.

According to this pneumatic tire 1, by making the angle θ of the protrusions 9 with respect to the tire radial direction not more than +60° and not less than −60°, it is possible to obtain a significant effect of reduction of air resistance. Also, by making the angle θ of the protrusions 9 with respect to the tire radial direction not less than +1° and not more than −1°, it is possible to obtain a significant effect of improvement in uniformity.

Also, in the pneumatic tire 1 according to the embodiment, preferably, the protrusions 9 have a height of protrusion from the tire side portion S that satisfies the range of not less than 1 mm and not more than 10 mm, have a number disposed in the tire circumferential direction of not less than 10 and not more than 50, and have a width in the lateral direction that satisfies the range of not less than 0.5 mm and not more than 5 mm.

Figure 16:
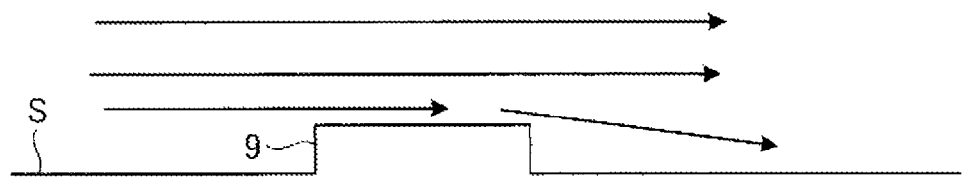
FIG. 16 is an explanatory drawing illustrating the flow of air around a protrusion having a height that is less than or equal to the prescribed range.
Figure 17:
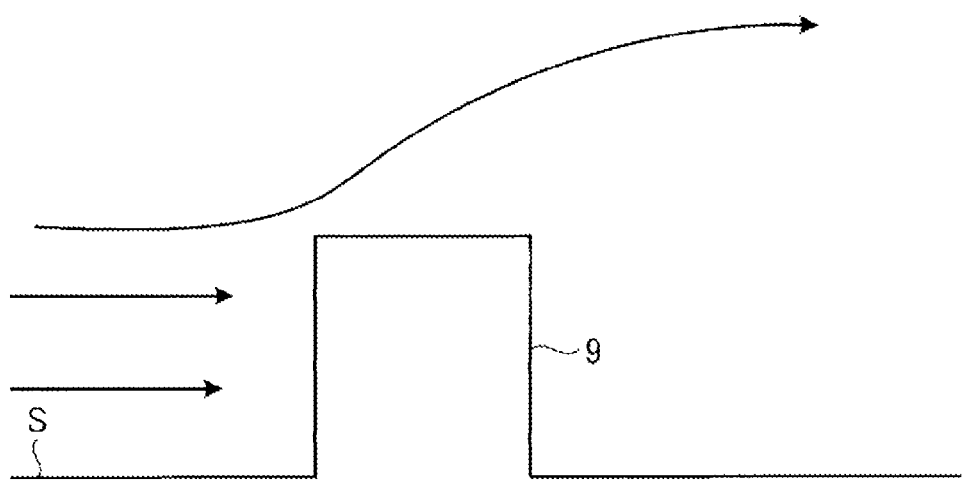
FIG. 17 is an explanatory drawing illustrating the flow of air around a protrusion having a height that is greater than or equal to the prescribed range.
Figure 18:
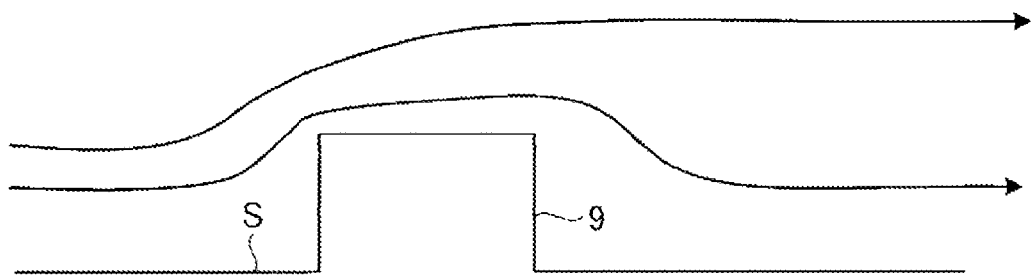
FIG. 18 is an explanatory drawing illustrating the flow of air around a protrusion having a height in the prescribed range.

If the height of the protrusions 9 is not more than 1 mm, as in the explanatory drawing of FIG. 16 which illustrates the air flow around a protrusion having a height that is not more than the prescribed range, the range over which the protrusions 9 contact the air flow is small, so it is difficult to obtain a more significant air distribution promotion effect and rectification effect due to the protrusions 9. Also, if the height of the radial direction protrusions 9 exceeds 10 mm, as in the explanatory drawing of FIG. 17 that illustrates the flow of air around a protrusion having a height that is not less than the prescribed range, the range over which the protrusions 9 contact the flow of air will be large, so the protrusions 9 will increase the air resistance and the air distribution promotion effect and rectification effect will be small. On this point, with the pneumatic tire 1 of this embodiment, as in the explanatory drawing of FIG. 18 that illustrates the flow of air around a protrusion having a height that is within the prescribed range, the protrusions 9 appropriately contact the flow of air, and thereby it is possible to obtain a more significant air distribution promotion effect and rectification effect due to the protrusions 9, and the air resistance of the vehicle can be effectively reduced.

Also, when the number of protrusions 9 is less than 10, it is difficult to obtain the air distribution promotion effect and the rectification effect. On the other hand, when the number of protrusions 9 exceeds 50, the protrusions 9 will increase the air resistance and the air distribution promotion effect and the rectification effect becomes smaller, the tire mass increases, and the rolling resistance tends to increase. Therefore, preferably, the number of protrusions 9 is in the range of not less than 10 and not more than 50. In addition, when the width of the protrusions 9 is less than 0.5 mm, the protrusions 9 can easily deform and it becomes difficult to obtain the air distribution promotion effect and the rectification effect. On the other hand, when the width of the protrusions 9 exceeds 5 mm, the protrusions 9 will increase the air resistance and the air distribution promotion effect and the rectification effect become smaller, the tire mass increases, and the rolling resistance tends to increase. Therefore, preferably, the width of the protrusions 9 is in the range of not less than 0.5 mm and not more than 5 mm.

Also, as illustrated in the partial appearance view viewed from the tire width direction of the pneumatic tire according to the embodiment in FIGS. 19 to 23, in the pneumatic tire 1 according to the embodiment, preferably, the protrusion 9 is formed as a row of fins 9A divided in the longitudinal direction into a plurality of fins 91, with each of the fins 91 of the row of fins 9A overlapping in the tire circumferential direction at least with the nearest fin, so that overall the row of fins 9A extends from the inner side to the outer side in the tire radial direction including the maximum tire width position H. When the protrusion 9 is divided into the plurality of fins 91, the space between the fins 91 may be lower than the protrusion height of the fin 91 (protrusion 9), it may protrude from the tire side portion S, or it may coincide with the tire side portion S.

Figure 19:
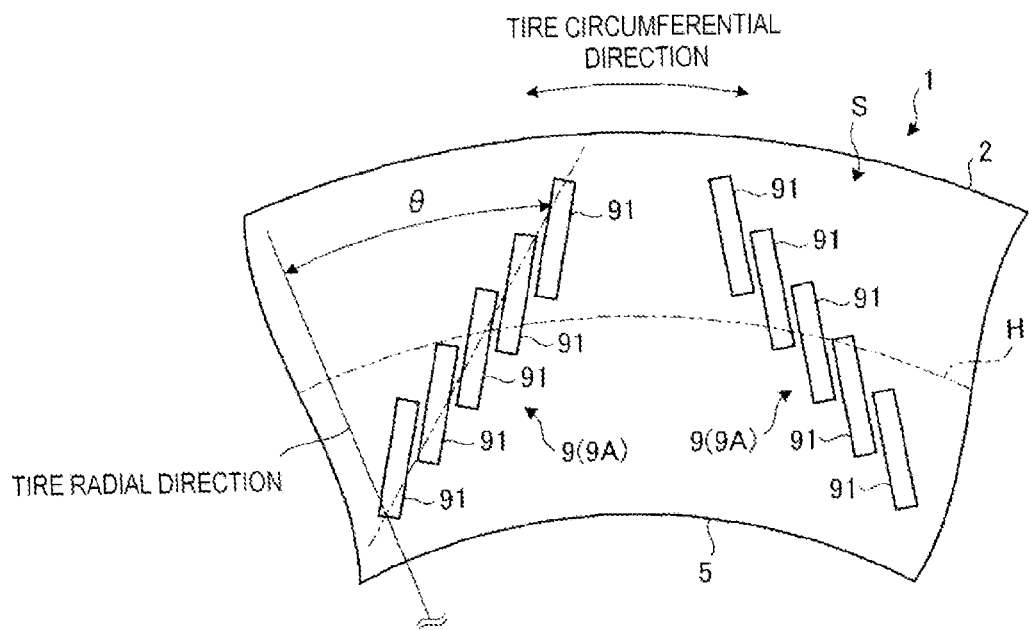
FIG. 19 is a partial appearance view of the pneumatic tire according to the embodiment of the present technology, viewed from the tire width direction.

In FIG. 19, the protrusions 9 are formed as rows of fins 9A divided into five straight fins in the longitudinal direction, the projections in the tire circumferential direction of the nearest fins 91 overlap, with end portions overlapping, and extending overall from the inner side to the outer side in the tire radial direction. In this case, the angle θ of the row of fins 9A constituting the protrusion 9 with respect to the tire radial direction is the angle θ of the extension direction with respect to the tire radial direction, where the extension direction is the straight line connecting the center in the lateral direction (direction intersecting the longitudinal direction) of the end on the inner side in the tire radial direction of the fin 91 disposed on the innermost side in the tire radial direction, and the center in the lateral direction of the end on the outer side in the tire radial direction of the fin 91 disposed on the innermost side in the tire radial direction.

Figure 20:
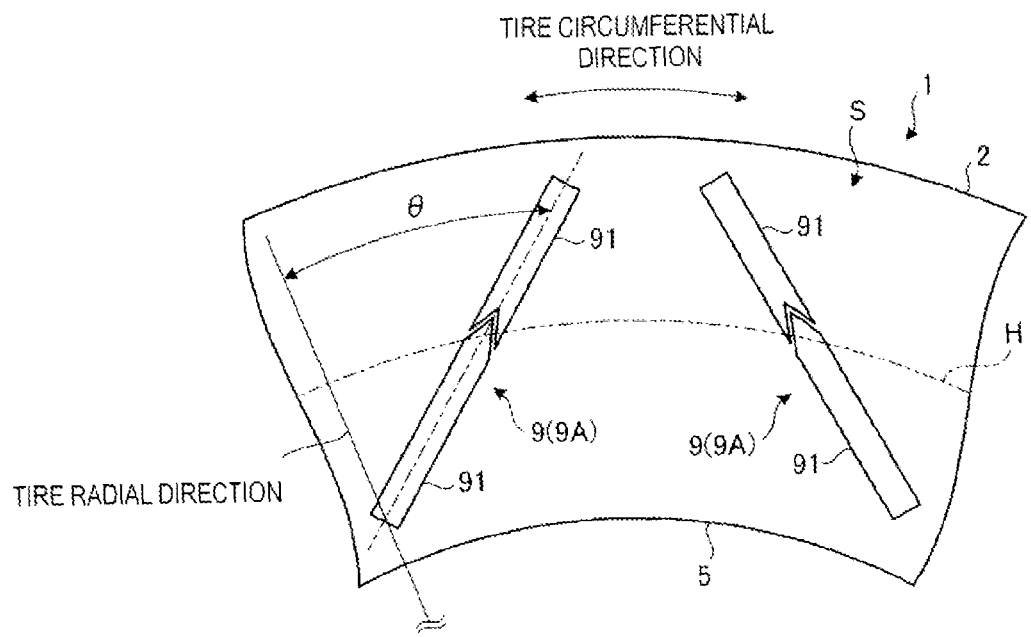
FIG. 20 is a partial appearance view of the pneumatic tire according to the embodiment of the present technology, viewed from the tire width direction.

In FIG. 20, the straight protrusions 9 are formed as rows of fins 9A divided into two fins 91 in the longitudinal direction, the projections of the nearest fins 91 overlap in the tire circumferential direction, with end portions overlapping in a recess and protrusion, and extending overall in the inner side and the outer side of the tire radial direction. In this case, the angle θ of the row of fins 9A constituting the protrusion 9 with respect to the tire radial direction is the angle θ of the extension direction with respect to the tire radial direction, where the extension direction is the straight line connecting the center in the lateral direction (direction intersecting the longitudinal direction) of the end on the inner side in the tire radial direction of the fin 91 disposed on the innermost side in the tire radial direction, and the center in the lateral direction of the end on the outer side in the tire radial direction of the fin 91 disposed on the innermost side in the tire radial direction.

Figure 21:
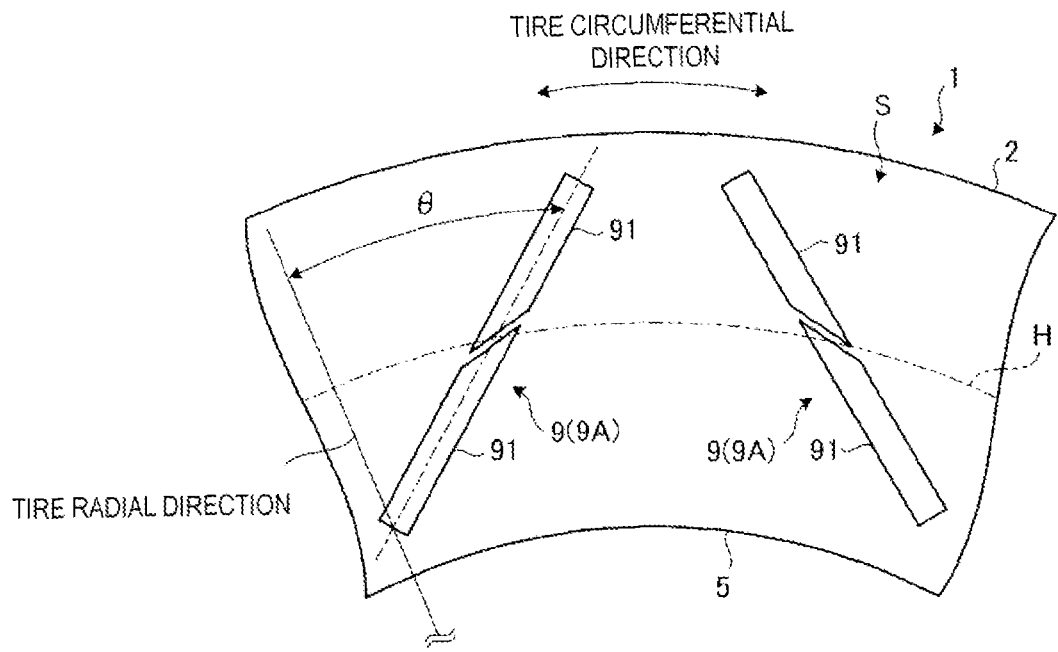
FIG. 21 is a partial appearance view of the pneumatic tire according to the embodiment of the present technology, viewed from the tire width direction.

In FIG. 21, the straight protrusions 9 are formed as rows of fins 9A divided into two fins 91 in the longitudinal direction, the projections of the nearest fins 91 overlap in the tire circumferential direction, with end portions overlapping at an inclination to each other, and extending overall in the inner side and the outer side of the tire radial direction. In this case, the angle θ of the row of fins 9A constituting the protrusion 9 with respect to the tire radial direction is the angle θ of the extension direction with respect to the tire radial direction, where the extension direction is the straight line connecting the center in the lateral direction (direction intersecting the longitudinal direction) of the end on the inner side in the tire radial direction of the fin 91 disposed on the innermost side in the tire radial direction, and the center in the lateral direction of the end on the outer side in the tire radial direction of the fin 91 disposed on the innermost side in the tire radial direction.

Figure 22:
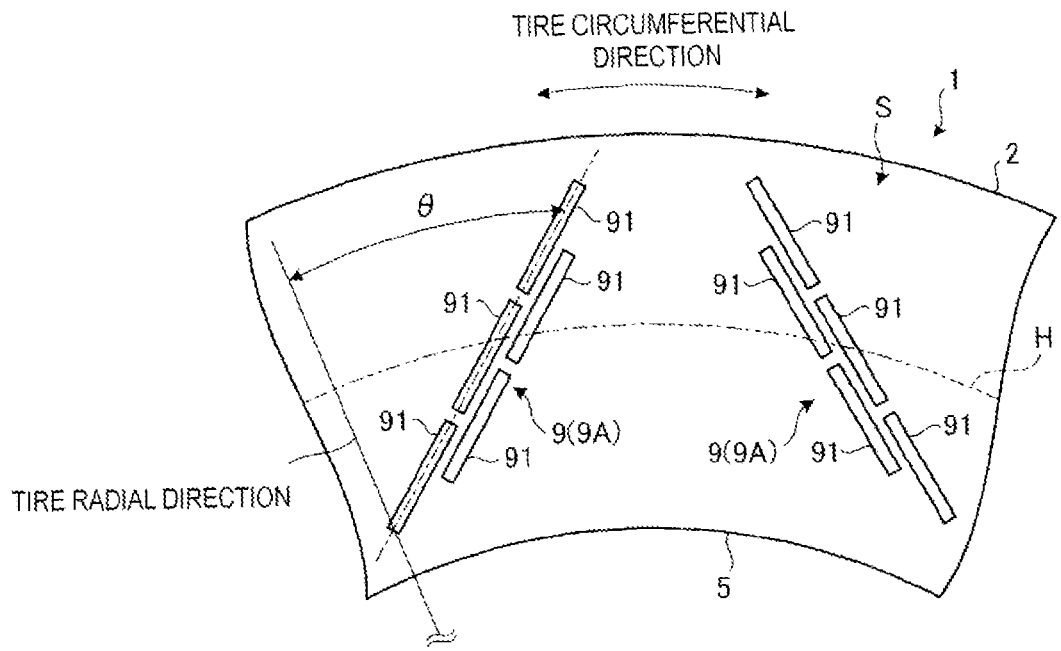
FIG. 22 is a partial appearance view of the pneumatic tire according to the embodiment of the present technology, viewed from the tire width direction.

In FIG. 22, the protrusions 9 are formed as rows of fins 9A divided into five straight fins 91 in the longitudinal direction, three fins 91 aligned in a straight line extending in the inner side and the outer side of the tire radial direction and two fins 91 aligned in a straight line extending in the inner side and the outer side of the tire radial direction are disposed parallel to each other in a linear manner, so that the projections in the tire circumferential direction of the closest fins overlap each other, with the ends of two fins 91 overlapping with one fin 91, and overall extending in the inner side and the outer side of the tire radial direction. In this case, the angle θ of the row of fins 9A constituting the protrusion 9 with respect to the tire radial direction is the angle θ of the extension direction with respect to the tire radial direction, where the extension direction is the straight line connecting the center in the lateral direction (direction intersecting the longitudinal direction) of the end on the inner side in the tire radial direction of the fin 91 disposed on the innermost side in the tire radial direction, and the center in the lateral direction of the end on the outer side in the tire radial direction of the fin 91 disposed on the innermost side in the tire radial direction.

Figure 23:
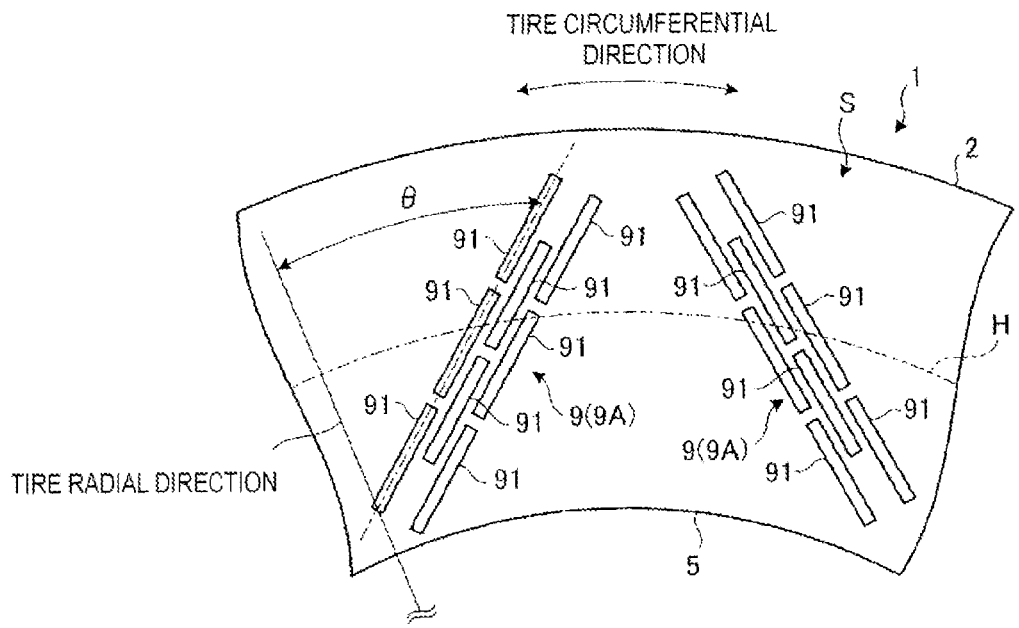
FIG. 23 is a partial appearance view of the pneumatic tire according to the embodiment of the present technology, viewed from the tire width direction.

In FIG. 23, the protrusions 9 are formed as rows of fins 9A divided into eight straight fins 91 in the longitudinal direction, two fins 91 aligned in a straight line extending in the inner side and the outer side of the tire radial direction are disposed parallel to each other in a linear manner between three fins 91 aligned in a straight line extending in the inner side and the outer side of the tire radial direction and three fins 91 aligned in a straight line extending in the inner side and the outer side of the tire radial direction, so that the projections in the tire circumferential direction of the closest fins 91 overlap each other, with the ends of four fins 91 overlapping with one fin 91, and overall extending in a linear manner in the inner side and the outer side of the tire radial direction. In this case, the angle θ of the row of fins 9A constituting the protrusion 9 with respect to the tire radial direction is the angle θ of the extension direction with respect to the tire radial direction, where the extension direction is the straight line connecting the center in the lateral direction (direction intersecting the longitudinal direction) of the end on the inner side in the tire radial direction of the fin 91 disposed on the innermost side in the tire radial direction, and the center in the lateral direction of the end on the outer side in the tire radial direction of the fin 91 disposed on the innermost side in the tire radial direction.

The form and arrangement of the fins 91 of the row of fins 9A that form the protrusion 9 are not limited to those forms illustrated in FIGS. 19 to 23.

According to the pneumatic tire 1, by forming the protrusion 9 as a row of fins 9A divided into a plurality of fins 91, the strain is dispersed in each individual fin due to bending of the tire side portion S, so the stiffness due to the protrusions 9 is further suppressed, so it is possible to obtain a more significant effect of improvement in uniformity, and the durability of the protrusions 9 can be improved.

Figure 24:
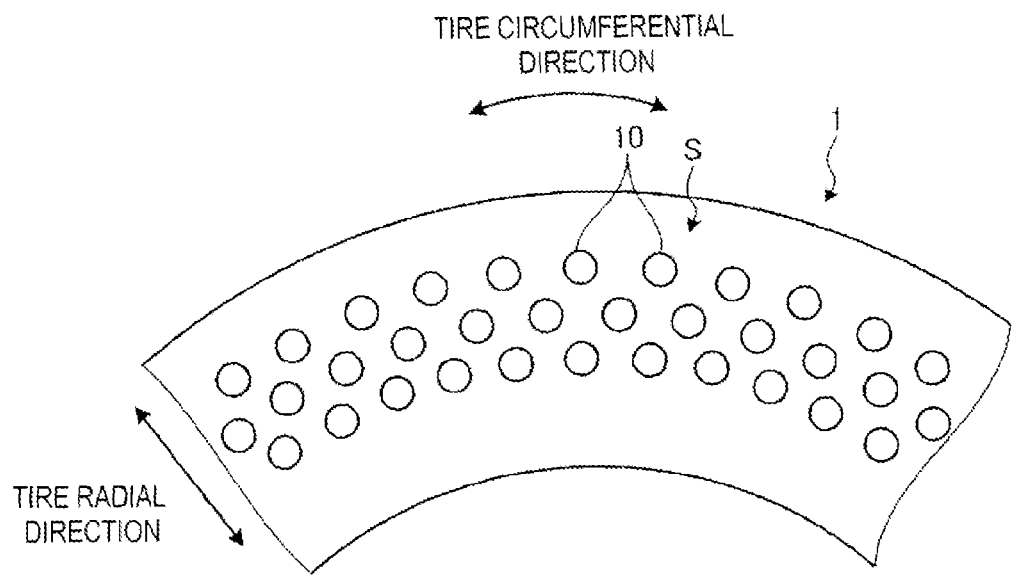
FIG. 24 is a partial appearance view of the pneumatic tire according to the embodiment of the present technology, viewed from the vehicle outer side.

Also, in the pneumatic tire 1 according to the embodiment, preferably, the protrusions 9 are disposed on the first tire side portion S, and, on the second tire side portion S, a plurality of recesses 10 is disposed, as illustrated in the partial appearance view viewed from the vehicle outer side of the pneumatic tire according to the embodiment in FIG. 24.

As illustrated in FIG. 24, the recesses 10 are disposed, for example, in a region of the tire side portion S at predetermined intervals in the tire radial direction and the tire circumferential direction.

The recesses 10 have an aperture shape that is open on the surface of the tire side portion S, and are formed in a circular shape, an elliptical shape, an oval shape, a polygonal shape, or the like. Also, the recesses 10 are formed so that the cross-sectional shape is a semicircular shape, a semi-elliptical shape, a semi-oval-shape, a mortar shape, a rectangular shape, or the like. In FIG. 24, the recesses 10 are disposed in a staggered manner in the tire radial direction and the tire circumferential direction, but they may be disposed in a line in the tire radial direction, or disposed in a line in the tire circumferential direction.

For example, the orientation with respect to the vehicle inner side and outer side when mounted on a vehicle is designated, and the protrusions 9 as described above are provided on the tire side portion S on the vehicle outer side, and the recesses 10 as described above are provided on the tire side portion S on the vehicle inner side.

The designation of orientation with respect to the vehicle inner side and the vehicle outer side is, for example, indicated by an indicator provided on the side wall portion 4 (not explicitly illustrated in the drawings). Note that the designations of the vehicle inner side and the vehicle outer side are not limited to cases when mounted on the vehicle. For example, in cases when assembled on a rim, orientation of the rim with respect to the inner side and the outer side of the vehicle in the tire width direction is set. Therefore, in cases when the pneumatic tire 1 is assembled on a rim, the orientation with respect to the vehicle inner side and the vehicle outer side in the tire width direction is designated.

Figure 25:
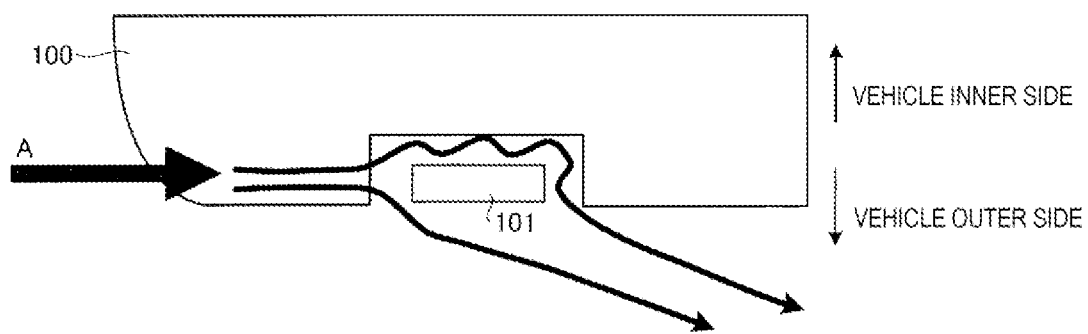
FIG. 25 is an explanatory drawing illustrating the flow of air around a normal pneumatic tire.

In this case, as illustrated in FIG. 25 which illustrates the flow of air in the vicinity of a normal pneumatic tire, a flow of air is produced in the direction of the arrow A in the drawings from the front to the rear of a vehicle around a pneumatic tire 101 not having the protrusions 9 and the recesses 10 due to driving the vehicle 100. The flow of air A passes between the pneumatic tire 101 and the vehicle 100 on the vehicle inner side of the pneumatic tire 101 and exits spreading on the vehicle outer side. Also, on the vehicle outer side of the pneumatic tire 101, the air flow passes while spreading to the vehicle outer side. These air flows cause vehicle resistance.

Figure 26:
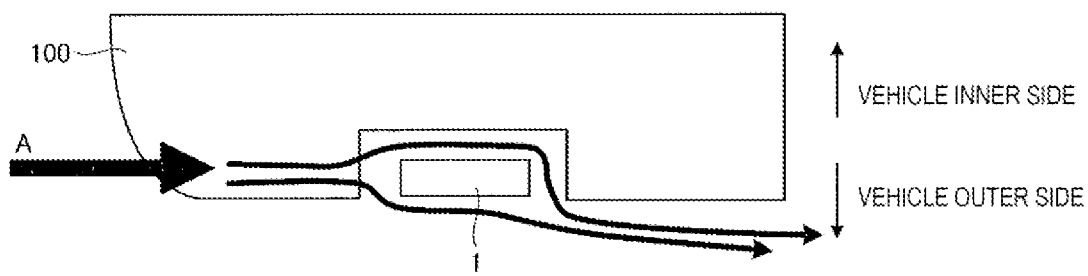
FIG. 26 is an explanatory drawing illustrating the flow of air around the pneumatic tire according to the embodiment of the present technology.

In contrast, by providing the protrusions 9 as described above on the vehicle outer side and providing the recesses 10 as described above on the vehicle inner side of the pneumatic tire 1, as illustrated in FIG. 26 which illustrates the flow of air in the vicinity of the pneumatic tire according to the embodiment, the flow of air A from the front side to the rear side of the vehicle on the vehicle inner side of the pneumatic tire 1 passes between the pneumatic tire 1 and the vehicle 100, and the air is made turbulent due to the recesses 10. Also, on the vehicle outer side of the pneumatic tire 1, the air that passes the vehicle outer side is made turbulent by the protrusions 9. Therefore, a turbulent flow boundary layer is generated on the periphery of the pneumatic tire 1, so on the vehicle inner side, expansion of air that escapes the vehicle outer side to the rear of the vehicle is suppressed, and, on the vehicle outer side, expansion of the air passing the vehicle outer side of the pneumatic tire 1 is suppressed. As a result, the spread of the passing air is suppressed, so the air resistance of the vehicle is reduced, and the fuel economy can be further improved.

Also, preferably, the pneumatic tire 1 according to the embodiment has a designated vehicle inner/outer orientation when mounted on a vehicle, and the protrusions 9 are disposed on the tire side portion S on the vehicle inner side.

In the pneumatic tire 1 provided with the protrusions 9 on the vehicle inner side as described above, the flow of air A (see FIG. 26) from the front side to the rear side of the vehicle 100 is promoted and rectified by the protrusions 9 on the vehicle inner side of the pneumatic tire 1. Therefore, turbulence of the air flow passing the vehicle inner side of the pneumatic tire 1 is suppressed. As a result, the spread of the passing air is suppressed, so the air resistance of the vehicle is reduced, and the fuel economy can be further improved.

If the vehicle inner/outer orientation when mounted on a vehicle is designated, and the protrusions 9 are disposed on the tire side portion on the vehicle inner side, more preferably, the recesses 10 are disposed on the tire side portion S on the vehicle outer side.

In this case, the flow of air A (see FIG. 26) from the front side to the rear side of the vehicle 100 is promoted and rectified by the protrusions 9 on the vehicle inner side of the pneumatic tire 1. Therefore, turbulence of the air flow passing the vehicle inner side of the pneumatic tire 1 is suppressed. On the other hand, the flow of air A (see FIG. 26) from the front side to the rear side of the vehicle 100 is made turbulent by the recesses 10 on the vehicle outer side of the pneumatic tire 1, so a turbulent boundary layer is generated around the periphery of the pneumatic tire 1, and separation from the pneumatic tire 1 is suppressed. Therefore, spreading of the air flow passing the vehicle outer side of the pneumatic tire 1 is suppressed. As a result, the spread of the passing air is suppressed, so the air resistance of the vehicle 100 is further reduced, and it is possible to further improve the fuel economy.

Preferably, the dimension of the opening portion of the recesses 10 satisfies the range of not less than 0.5 mm and not more than 10 mm, and the depth satisfies the range of not less than 0.3 mm and not more than 2 mm.

If the dimension of the opening portion of the recesses 10 is not less than 0.5 mm and the depth is not less than 0.3 mm, sufficient turbulent flow generation effect can be obtained. On the other hand, if the dimension of the opening portion of the recesses 10 is not more than 10 mm and the depth is not more than 2 mm, it is possible to obtain a turbulent flow generation effect without increasing the air resistance.

EXAMPLES

In these examples, performance tests for the fuel economy improvement rate and uniformity were performed on a plurality of types of pneumatic tires under different conditions (see FIGS. 27A to 29).

In this fuel economy improvement rate performance testing, a pneumatic tire having a tire size of 195/65R15 was assembled on a regular rim and inflated to a regular inner pressure, then the pneumatic tire was mounted on a compact front-wheel drive vehicle having an engine displacement of 1,500 cc+motor assist drive. The method of evaluating the fuel economy improvement rate was to measure the fuel economy for a case where the test vehicle Described above was driven 50 laps on a 2 km (total length) test course at a speed of 100 km/h. Based on these measurement results, indices were evaluated for the fuel economy improvement rate setting the pneumatic tires according to Conventional Example 1, Conventional Example 2, and Conventional Example 3 as a reference (100.0). In this evaluation, larger index scores indicate enhanced fuel economy improvement rates.

In the uniformity performance tests, pneumatic tires of tire size 195/65R15 were assembled onto a regular rim, inflated with the regular inner pressure, the regular load was applied, and the radial force variation (RFV) was measured using a force variation tester in accordance with the standard JASO C607 "Test Procedures for Automobile Tire Uniformity". The radial force variation was expressed as an index with the conventional examples as a reference (100), and the uniformity was deemed to be good for indices as low as 97.

In FIGS. 27A to 29, in the pneumatic tires according to Conventional Example 1, Conventional Example 2, and Conventional Example 3, straight-line protrusions coinciding with the tire radial direction were disposed at intervals in the tire circumferential direction in the region on the inner side in the tire radial direction of the maximum tire width position, and straight-line protrusions whose extension direction was inclined with respect to the tire radial direction were disposed at intervals along the tire circumferential direction in the region on the outer side in the tire radial direction from the maximum tire width position, and the adjacent protrusions are disposed with the opposite orientation of the inclination with respect to the tire radial direction. In the pneumatic tires according to Comparative Example 1, Comparative Example 2, and Comparative Example 3, straight line protrusions were disposed at intervals in the tire circumferential direction along the tire radial direction including the maximum tire width position.

On the other hand, in FIGS. 27A-27B, in contrast to Conventional Example 1 and Comparative Example 1, in the pneumatic tires according to Working Example 1 to Working Example 11, a plurality of protrusions 9 was disposed at intervals in the tire circumferential direction extending in an elongated manner from the inner side to the outer side in the tire radial direction including the maximum tire width position, the extension direction of each of the protrusions 9 was inclined with respect to the tire radial direction, and each of the protrusions 9 adjacent to each other in the tire circumferential direction with the opposite orientation of the inclination with respect to the tire radial direction. Also, in the pneumatic tires according to Working Example 2 to Working Example 11, adjacent protrusions were disposed to be symmetrical with respect to the tire radial direction. In the pneumatic tires according to Working Example 4 to Working Example 11, the angle of the protrusions with respect to the tire radial direction was within the prescribed range. In the pneumatic tires according to Working Example 7 to Working Example 11, the protrusions were formed as a row of fins from a plurality of fins, and the fins overlapped in the tire circumferential direction. Recesses were disposed on the pneumatic tires according to Working Example 8 and Working Example 11. The protrusions were disposed on the vehicle inner side on the pneumatic tires according to Working Example 9 and Working Example 11. Protrusions were disposed on both sides of the vehicle on the pneumatic tires according to Working Example 10.

Also, in FIGS. 28A-28B, in contrast to Conventional Example 2 and Comparative Example 2, in the pneumatic tires according to Working Example 12 to Working Example 22, a plurality of protrusions 9 was disposed at intervals in the tire circumferential direction extending in an elongated manner from the inner side to the outer side in the tire radial direction including the maximum tire width position, the extension direction of each of the protrusions 9 was inclined with respect to the tire radial direction, and each of the protrusions 9 adjacent to each other in the tire circumferential direction was disposed with the opposite orientation of the inclination with respect to the tire radial direction. Also, in the pneumatic tires according to Working Example 12 to Working Example 22, adjacent protrusions were disposed to be symmetrical with respect to the tire radial direction. In the pneumatic tires according to Working Example 12 to Working Example 22, the angle of the protrusions with respect to the tire radial direction was within the prescribed range. In the pneumatic tires according to Working Example 12 to Working Example 22, the projection height of the protrusions, the number of protrusions in the tire circumferential direction, and the width in the lateral direction of the protrusions were within the prescribed ranges. In the pneumatic tires according to Working Example 18 to Working Example 22, the protrusions were formed as a row of fins formed from a plurality of fins, and the fins were overlapped in the tire circumferential direction. Recesses were disposed on the pneumatic tires according to Working Example 19 and Working Example 22. The protrusions were disposed on the vehicle inner side on the pneumatic tires according to Working Example 20 and Working Example 22. Protrusions were disposed on both sides of the vehicle on the pneumatic tires according to Working Example 21.

Also, in FIG. 29, in contrast to Conventional Example 3 and Comparative Example 3, in the pneumatic tires according to Working Example 23 to Working Example 28, a plurality of protrusions 9 was disposed at intervals in the tire circumferential direction extending in an elongated manner from the inner side to the outer side in the tire radial direction including the maximum tire width position, the extension direction of each of the protrusion 9 was inclined with respect to the tire radial direction, and each of the protrusions 9 adjacent to each other in the tire circumferential direction was disposed with the opposite orientation of the inclination with respect to the tire radial direction. Also, in the pneumatic tires according to Working Example 23 to Working Example 28, adjacent protrusions were disposed to be symmetrical with respect to the tire radial direction. In the pneumatic tires according to Working Example 23 to Working Example 28, the angle of the protrusions with respect to the tire radial direction was within the prescribed range. In the pneumatic tires according to Working Example 23 to Working Example 28, the projection height of the protrusions, the number of protrusions in the tire circumferential direction, and the width in the lateral direction of the protrusions were within the prescribed ranges. In the pneumatic tires according to Working Example 24 to Working Example 28, the protrusions were formed as a row of fins formed from a plurality of fins, and the fins were overlapped in the tire circumferential direction. Recesses were disposed on the pneumatic tires according to Working Example 25 and Working Example 28. The protrusions were disposed on the vehicle inner side on the pneumatic tires according to Working Example 26 and Working Example 28. Protrusions were disposed on both sides of the vehicle on the pneumatic tires according to Working Example 27.

From the test results shown in FIGS. 27A to 29, it can be seen that for the pneumatic tires according to Working Example 1 to Working Example 28, the air resistance reduction effect is maintained, the fuel economy improvement rate is maintained, and the uniformity is improved.

What is claimed is:

1. A pneumatic tire disposed within a wheel housing of an automobile, comprising: a plurality of protrusions disposed at intervals in a tire circumferential direction on at least one tire side portion, extending in an elongated manner from an inner side to an outer side in a tire radial direction including a maximum tire width position, an extension direction of each of the protrusions being inclined with respect to the tire radial direction, and each of the protrusions adjacent to each other in the tire circumferential direction being disposed with an opposite orientation of an inclination with respect to the tire radial direction, and the number of protrusions disposed in the tire circumferential direction satisfies a range of not less than 10 and not more than 50; wherein:

each of the protrusions adjacent to each other in the tire circumferential direction is disposed to be symmetrical with respect to the tire radial direction;

an angle $\theta$ of the protrusions with respect to the tire radial direction with an end on an inner side in the tire radial direction as a reference point about a tire rotational direction satisfies a range of $+1°\leq\theta\leq+60°$, or $-60°\leq\theta\leq-1°$;

a height that the protrusions protrude from a tire side portion satisfies a range of not less than 1 mm and not more than 10 mm, and a width in a lateral direction satisfies a range of not less than 0.5 mm and not more than 5 mm; and the protrusions are formed as a row of fins divided in a longitudinal direction into a plurality of fins, with each of the fins of the row of fins overlapping in the tire circumferential direction at least with the closest fin, so that overall the row of fins extends from the inner side to the outer side in the tire radial direction including the maximum tire width position.

2. The pneumatic tire according to claim 1, wherein the protrusions are disposed on a first tire side portion, and a plurality of recesses is disposed on a second tire side portion.

3. The pneumatic tire according to claim 2, wherein a vehicle inner/outer orientation when mounted on a vehicle is designated, and the protrusions are disposed on the tire side portion on a vehicle inner side.

4. The pneumatic tire according to claim 1, wherein a vehicle inner/outer orientation when mounted on a vehicle is designated, and the protrusions are disposed on the tire side portion on a vehicle inner side.

5. The pneumatic tire according to claim 1, wherein a cross-sectional shape in the lateral direction of the protrusions has corners that are curved, and a base portion that protrudes from the tire side portion is curved.

6. The pneumatic tire according to claim 1, wherein the protrusions are formed as S-shaped protrusions in the longitudinal direction of the protrusions.

* * * * *